(12) United States Patent
Meuronen et al.

(10) Patent No.: US 6,292,669 B1
(45) Date of Patent: Sep. 18, 2001

(54) ROUTING SHORT MESSAGES

(75) Inventors: Timo Meuronen, Espoo; Pete Pihko, Helsinki, both of (FI); Patrik Gustafsson, Irving, TX (US)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/454,946

(22) Filed: Dec. 3, 1999

Related U.S. Application Data

(63) Continuation of application No. PCT/FI98/00473, filed on Jun. 2, 1998.

(30) Foreign Application Priority Data

Jun. 3, 1997 (FI) ............ 972357

(51) Int. Cl.⁷ ............ H04Q 7/20
(52) U.S. Cl. ............ 455/466; 455/412; 455/414; 455/422; 455/445; 455/459
(58) Field of Search ............ 455/422, 466, 455/433, 412, 424, 428, 459, 450, 414, 445

(56) References Cited

U.S. PATENT DOCUMENTS

| | | | |
|---|---|---|---|
| 5,577,102 | * 11/1996 | Koivunen | 455/433 |
| 5,628,051 | * 5/1997 | Salin | 455/433 |
| 5,719,918 | * 2/1998 | Serbetciouglu et al. | 455/466 |
| 5,768,509 | * 1/1998 | Gunluk | 395/200.33 |
| 5,878,347 | * 3/1999 | Joensuu et al. | 455/433 |
| 5,881,235 | * 3/1999 | Mills | 395/200.51 |
| 5,903,726 | * 5/1999 | Donovan et al. | 709/206 |
| 5,915,222 | * 6/1999 | Olsson et al. | 455/466 |
| 5,946,630 | * 8/1999 | Willars et al. | 455/466 |
| 6,044,275 | * 3/2000 | Boltz et al. | 455/466 |
| 6,052,591 | * 4/2000 | Bhatia | 455/445 |
| 6,067,529 | * 5/2000 | Ray et al. | 705/26 |
| 6,119,014 | * 9/2000 | Aplperovich et al. | 455/466 |
| 6,134,441 | * 10/2000 | Astrom et al. | 455/445 |
| 6,175,743 | * 1/2001 | Alperovich et al. | 455/466 |

FOREIGN PATENT DOCUMENTS

| | | |
|---|---|---|
| WO 93/26131 | 12/1993 | (WO) . |
| WO 94/09599 | 4/1994 | (WO) . |
| WO 95/12292 | 5/1995 | (WO) . |
| WO 96/28945 | 9/1996 | (WO) . |
| WO 97/14254 | 4/1997 | (WO) . |
| WO 97/20442 | 6/1997 | (WO) . |

OTHER PUBLICATIONS

Digital cellular telecommunications system (Phase 2+): Technical realization of the short message service (SMS); Point–to–Point (PP) GSM 03.40 version 5.4.1), *ETS* 300 901, Apr. 1997.

Copy of International Search Report for PCT/FI98/00473.

* cited by examiner

*Primary Examiner*—Daniel Hunter
*Assistant Examiner*—Yemane Woldetatios
(74) *Attorney, Agent, or Firm*—Altera Law Group, LL

(57) ABSTRACT

A method and an equipment implementing the method in a mobile communication system in which short messages may be sent amid actual signalling, whereby one of more short message service centers providing short message services are linked to the mobile communication system. An identifier supplied by the subscriber and associated with the desired service is included in a mobile originated short message. On the basis of this identifier a database search is performed in a database connected with the mobile communication system, the database comprising identifiers associated with short message services available to subscribers and related routing information. The message is sent to the routing address obtained on the basis of the database search. A short message submitted by a subscriber may thus be routed to the desired short message service center without the subscriber having to directly attend to the routing.

15 Claims, 4 Drawing Sheets

Figure 1:
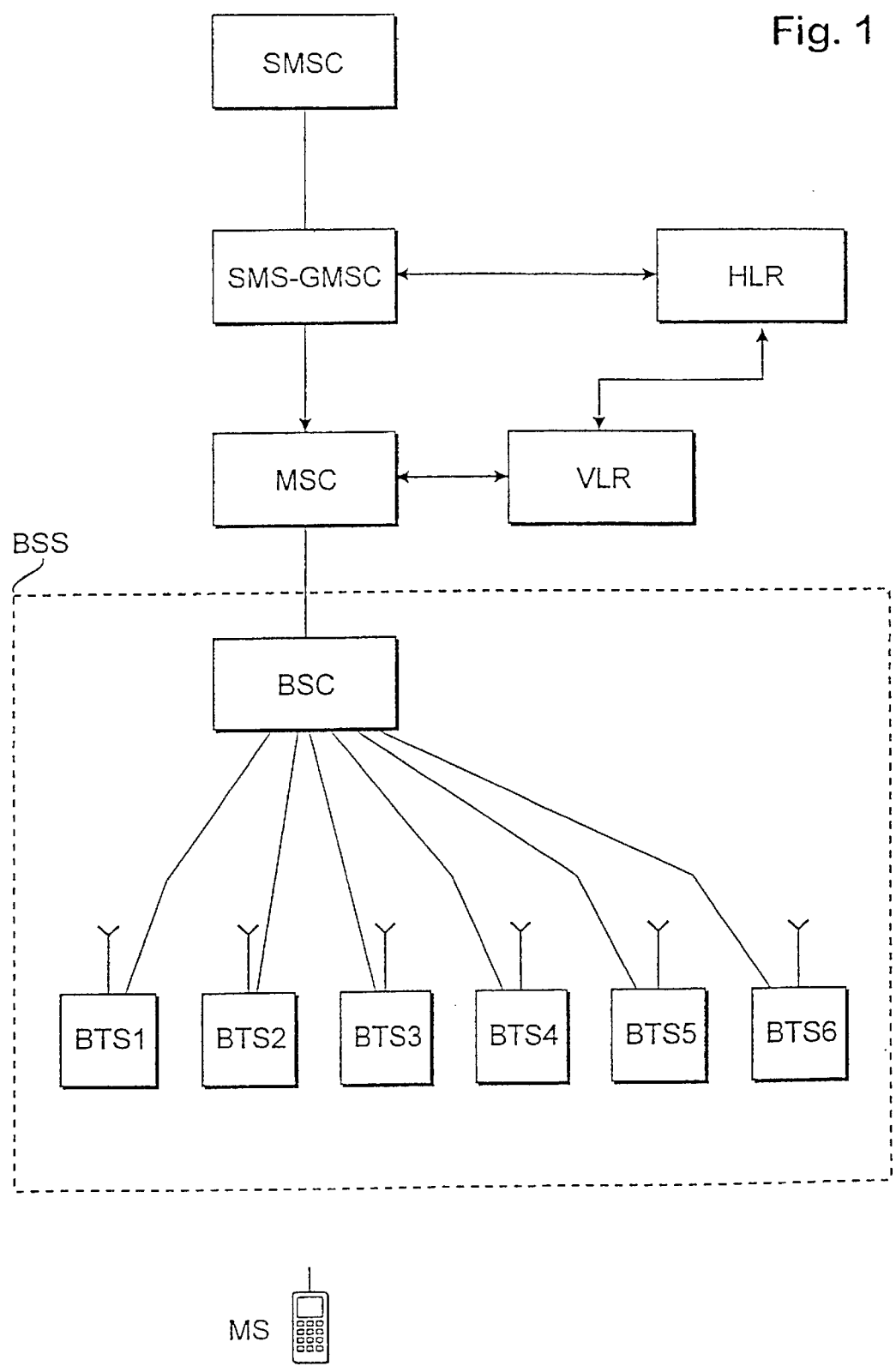

| Application | Pid | Prefix | Smsc Address | Routing Information |
|---|---|---|---|---|
| CIMD | - | 991 | 443580002 | IP:131.228.41.8/887 |
| CIMD | - | 991 | 443580003 | No routing |
| FAX | 34 | 992 | 443580001 | X.25:0244123456 |
| E-MAIL | 49 | 991 | 443580002 | IP:131.228.41.8/887 |

ROUTING SHORT MESSAGES

This application is a continuation of international application serial number PCT/FI98/00473, filed Jun. 2, 1998.

FIELD OF THE INVENTION

The invention relates to a method used in a mobile communication system in which short messages may be sent amid actual signalling. One or more short message service centres providing short message services are linked to the mobile communication system.

BACKGROUND OF THE INVENTION

In addition to normal speech and data connections set up on traffic channels in digital mobile communication systems, short digital data messages, short messages, transferred on the control and signalling channels of the systems, may be sent amid actual signalling. A short message service centre is added in association with the mobile communication system for relaying short messages. In connection with a mobile originated short message, a subscriber creates the short message by means of the keyboard of a terminal, and the terminal submits the short message on a signalling channel via a base station and a mobile switching centre to the short message service centre. The short message service centre forwards the short message to another network, or on signalling channels via the mobile communication network to the terminal of another subscriber.

Services offered to subscribers via short messages also increase constantly. Several in e.g. voice and text mode delivered services may be offered to subscribers along with short messages. In addition to normal mobile terminating (MT) and mobile originated (MO) short messages, a subscriber may receive e.g. notices, ads, personal reminders, and may order information on sources offering these to his/her mobile station, and may transfer measuring results from one location to another, etc.

As the supply increases, an advantageous way to deal with the services is to arrange different kind of services to different short message service centres. By this time some implemented networks comprise several short message service centres, and as the selection of services increases, the number of short message service centres in a network will continue to grow. A number of short message service centres may be linked to a mobile communication network, e.g. one dealing with operations related to short messages and speech mail between mobile stations, another with telefax and e-mail operations, and a third with operations related to information services offered (e.g. weather report, stock exchange rates, sports results etc.).

Currently the addition of short message service centres to the network causes a subscriber extra work in connection with their use, because in order to be able to direct a message to the desired short message service centre, the user has to know and remember the addresses of available short message service centres and update the number of the short message service centre used by the mobile station so that it corresponds to the desired destination of the message. In practice, such activity is not required of a subscriber, but instead the services have to be offered in an as user friendly form as possible in order to be able to produce services profitably to an adequately large number of subscribers.

SHORT DESCRIPTION OF THE INVENTION

It is an object of the present invention to provide a simple and easily implemented solution for routing a short message submitted by a subscriber to the desired short message service centre without the subscriber directly having to attend to the routing.

The object is achieved with a method according to claim 1, and is characterized in that the method comprises steps wherein:

a database (DB) for storing identifiers and related routing information regarding short message services available to subscribers is connected to the mobile communication system, an identifier associated with the desired service and supplied by the subscriber is included in a mobile (MS) originated short message, said identifier is picked from the short message as a response to the received short message, a database search is performed in said database (DB) connected to the mobile communication system by using at least said identifier picked from the short message as a search index, and the message is sent to an address indicated by routing information obtained on the basis of the database search.

The invention also relates to a mobile switching centre according to the independent claim 7, a short message service centre according to the independent claim 11, and mobile communication systems according to the independent claims 14 and 15.

Typically, the address of a short message service centre is stored in a mobile station. When a subscriber gives a transmission command, the short messages are primarily sent to said address. The invention is based on the idea that before transmission of a short message, the subscriber supplies an identifier related to the desired short message service. This identifier is easy to use or easy to remember. A database including information on routing information associated with the identification is added to the system. By means of the database the system is able to route the short message towards a secondary short message service centre offering the chosen service. At its simplest the identifier may be a menu choice or a prefix resembling an area code, easy for the subscriber to remember.

An advantage of the solution according to the invention is that a subscriber does not directly have to attend to the right routing of a short message to the service-associated short message service centre. A service-specific definition of the destination address of the short message does not have to be memorized or changed, even if the services were offered from separate units producing services. The invention provides a simple and easily implemented solution by means of which a subscriber can transparently use short message services of various units offering different services, and provides thus an essential improvement to prior art.

LIST OF DRAWINGS

Figure 2:
Figure 3:
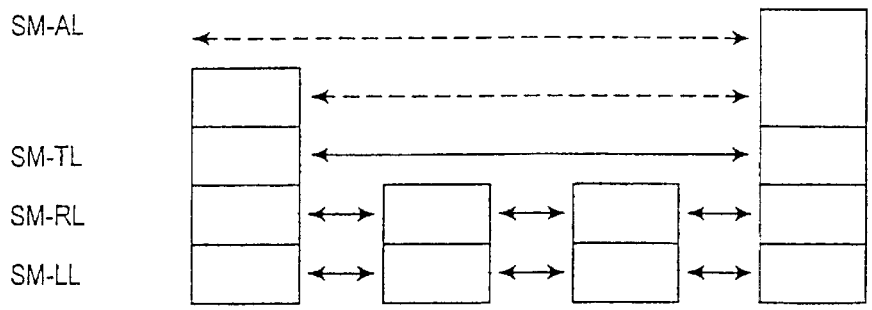
Figure 3:
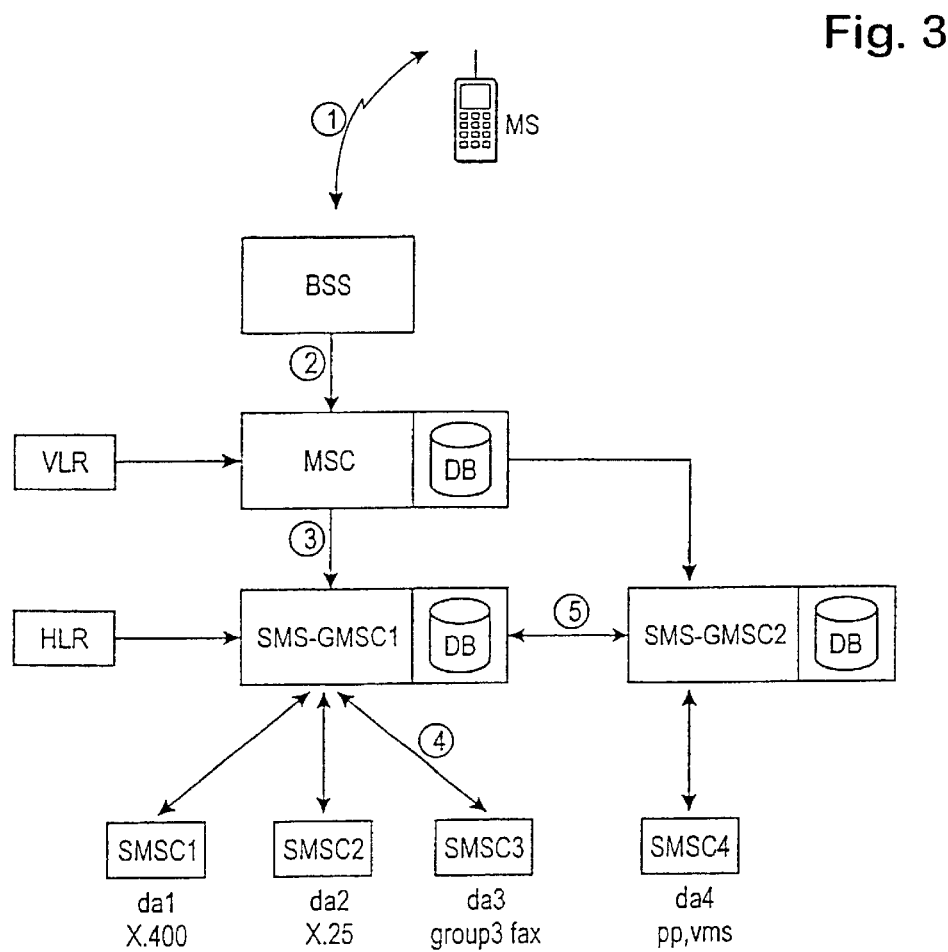
Figures 4, 5:
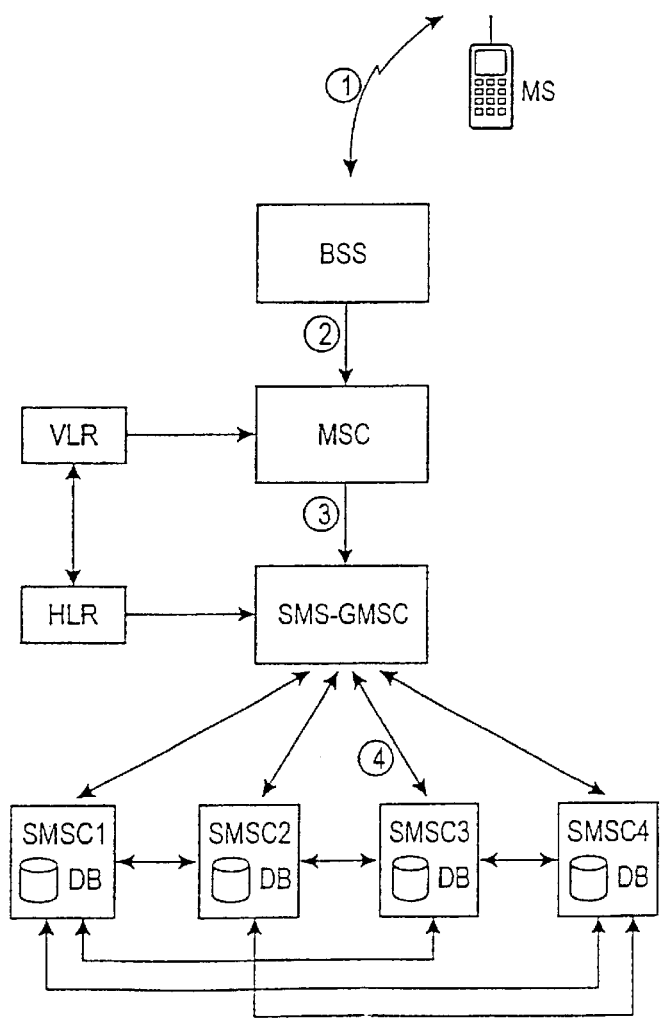
Figure 6:
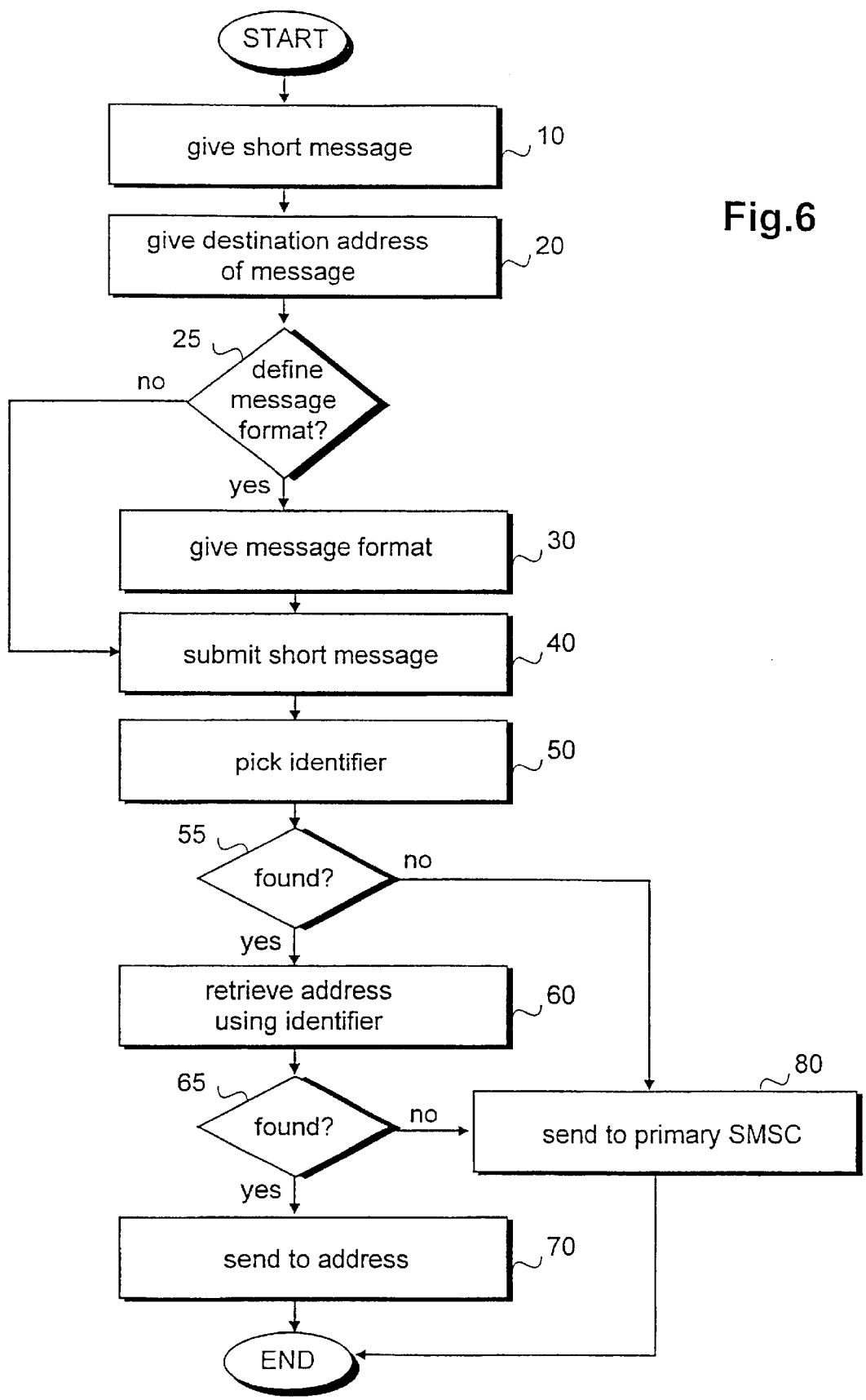

The invention will be described in more detail below with reference to the attached drawings, in which FIG. 1 is a block diagram illustrating the basic structure of the GSM system and the linking of short message service centres to a mobile communication system, FIG. 2 shows a protocol architecture used in transferring short messages according to the GSM specifications, FIG. 3 shows a block and signalling diagram illustrating the transfer of short messages in a network comprising a plurality of short message service centres used for providing various services, FIG. 4 is table illustrating the use of prefixes in the implementation of a routing database according to the invention, FIG. 5 is a block and signalling diagram illustrating a solution according to a secondary embodiment of the invention, and FIG. 6 is a block diagram illustrating a method of routing a short message according to the invention.

DETAILED DESCRIPTION OF THE INVENTION

In the following the invention will be described by using as an example the short message service of the GSM mobile communication system (Global System for Mobile Communications, GSM), but the invention may also be applied to other similar radio systems employing the same kind of message service, such as DCS1800 (Digital Communication System) and PCN (Personal Communication Network), and to mobile communication systems according to the EIA/TIA INTERIM standard.

FIG. 1 shows briefly the basic structural parts of the GSM system, but without a more detailed description of their characteristics or other subareas of the system. As to a more detailed description of the GSM system, reference is made to the GSM recommendations and the publication "The GSM system for Mobile Communications", M. Mouly and M. Pautet, Palaiseau, France, 1992, ISBN: 2-9507190-0-0-7.

A mobile switching centre MSC attends to switching incoming and outgoing calls. It performs tasks similar to those carried out by a centre in the public telephone network (PSTN). In addition, it also performs operations typical of mobile telephone traffic only, such as e.g. subscriber location administration, in co-operation with the subscriber registers of the network. The subscriber registers in the GSM system are called a home location register HLR and a visitor location register VLR. HLR stores permanently subscriber data and information on the VLR within whose area a MS is located. The visitor location register VLR again stores subscriber data of a mobile station MS temporarily during the time the mobile station is in the area of the mobile switching centre MSC associated with the visitor location register VLR. Typically, one VLR serves one mobile switching centre MSC. Mobile stations MS are connected to the centre MSC by means of base station systems BSS. The base station system BSS comprises base station controllers BSC and base stations BTS. One base station controller BSC is used for the control of several base stations BTS.

Each base station BTS has at its disposal one or more carrier wave pairs by which it can set up a duplex radio connection with a mobile station MS roaming in its area. Each carrier wave is divided into several, generally eight, TDMA time slots, i.e. channels. These GSM system channels can be divided into two categories: traffic channels (TCH) and control or signalling channels (CCH).

Speech or data may be transmitted on traffic channels, and a traffic channel is always allocated to one call only. Control or signalling channels are used for the signalling needed for system control. Fixed signalling and traffic channels exist between a base station BTS, a base station controller BSC, and a mobile switching centre MSC.

There are several types of control channels. A Broadcast Control Channel BCCH is a unidirectional control channel from a base station BTS to a mobile station MS, and is used for transmitting to the mobile station cell-specific information on effect levels used, BCCH frequencies of adjacent cells, etc. A BCCH channel also includes data on synchronization and frequency correction, by means of which the mobile station is locked into the system.

Having been locked, the mobile station MS listens to base station BTS calls on a Common Control Channel CCCH, used solely to set up a signaling connection. A connection is established in several stages: 1) forwarding a call from a base station BTS to a mobile station MS 1, 2) transmission of a random access generated by the mobile station MS as a result of the received call, or otherwise, from the mobile station to the base station BTS, and 3) allocation of a Stand alone Dedicated Control Channel SDCCH to the connection. Actual signalling between the base station and the mobile station MS is carried out on the SDCCH control channel. If the signalling on the SDCCH channel is call set-up signalling, the connection is transferred to a traffic channel TCH.

A parallel control channel SACCH (Slow Associated Control Channel) is used along with a traffic channel TCH defined for data or speech transmission between a base station BTS and a mobile station MS, or a connection-specific control channel SDCCH defined for signalling between them. A parallel control channel is mainly used for transmission of measurements performed by the mobile station MS during the connection from the mobile station to the base station BTS.

In the GSM mobile communication system, SDCCH and SACCH control channels may be used for transmission of short digital data messages, i.e. what are known as Short Messages, between a mobile station MS and a Short Message Service Centre SMSC linked to the system. The short message service centre is a centre linked to the GSM system and via which short messages are transmitted and can be stored there for later transmission in case the receiving party is not reached. Short messages are transmitted to the GSM system via one or more mobile switching centres acting as a short message service centre SMS-GMSC. In the GSM recommendations, the term G-MSC refers to a gateway MSC delivering mobile terminating (MT-SMS) short messages, and correspondingly, the term IW-MSC refers to a gateway MSC submitting mobile originated (MO-SMS) messages. Below, these gateway MSCs are referred to by the term short message gateway MSC SMS-GMSC.

In the GSM system, short messages are data messages with a maximum length of 140 bytes. A short message may be a Mobile Terminating MT delivery or a Mobile originated MO short message submission. A cell broadcast may also be carried out via the short message service, whereby a message is sent to all mobile stations in the area of one or more cells.

If a mobile station MS has a connection on a traffic channel TCH, short messages are forwarded on the SACCH control channel. Otherwise the short messages are forwarded on the SDCCH control channel. HLR and VLR are used for routing short messages in a mobile communication network essentially similarly as for routing calls.

FIG. 2 shows a protocol architecture used in short message transfer according to the GSM specifications. In the GSM system, SM-TP (Short Message Transport Layer Protocol) is a protocol defined between a short message service centre SMSC and a mobile station. In this protocol, a SMS-DELIVER message is a data message transmitted from the short message service centre to the mobile station, and correspondingly, a SMS-SUBMIT is a data message transmitted from the mobile station to the short message service centre. SM-RP is a protocol layer between a mobile station and a mobile switching centre MSC of the GSM network, chiefly associated with references and address information. An RP-MT-DATA message is a data message of the RP layer terminating in a mobile station, and correspondingly, an RP-MO-DATA message is a data message of the RP layer originated from a mobile station.

In the following descriptions presenting the preferred embodiments of the invention, the parameters of the SMS-SUBMIT message (PID, TP-DA) of the TP layer and the RP-MO-DATA message (RP-DA) of the RP layer are used without, however, limiting the invention to these messages or to the presented alternatives.

Many developed mobile station models (e.g. Nokia 2110) comprise routines for choosing the desired telematic service. The menu alternative chosen by a subscriber from the mobile station determines the value of the PID parameter of the SMS-SUBMIT message. PID (Protocol Identifier) is an 8-bit field of the SMS-SUBMIT message, used in the TP layer either to refer to the upper layer protocol used or to indicate interworking with a certain type of a telematic device. As to a more detailed description of the PID parameter reference is made to the GSM reference GSM 3.40 "European digital cellular telecommunications system (Phase 2); Technical realization of the Short Message Service (SMS) Point to Point (PP)".

Typically, the address of a short message service centre has been stored as a default value in the mobile station. In the following, this address will be called the primary short message service centre address of the mobile station. The block diagram in FIG. 3 illustrates short message transfer in a network comprising a plurality of short message service centres used for providing various services. In the case described in the example, subscriber A wishes to transmit a short message as a telefax (group 3) to the telefax number of subscriber B in a short message network comprising four different function-related short message service centres, SMSC1 to SMSC4, and two short message gateway MSCs, SMS-GMSC1 and SMS-GMSC2, relaying the short messages of the former. In present arrangements, a subscriber would have to find out the address da3 of the short message service centre SMSC3 associated with said service before submitting the message. The subscriber would then have to give the address from the mobile station as the short message service centre destination address (RP-DA), and change the definition affecting the PID value, typically by a choice from the mobile station menu. Not until after these procedures could the message be submitted, after normal procedures, via the radio system BSS (connection 1) to the mobile switching centre MSC (connection 1), from where the short message is routed via the short message service centre SMS-GMSC1 (connection 3) to the short message service centre SMSC3 (connection 4) given by the subscriber.

In a preferred embodiment of the invention, a database DB in which information on the short message forms available to the subscribers, including related routing information, is stored, is connected to at least one short message gateway MSC of the mobile communication system. In this case only the subscriber has to give the value of the desired PID parameter with the short message, and forward the short message without attending to the address of the short message service centre to be supplied. The short message gateway MSC, comprising the database DB, picks the PID parameter from the short message, performs a database search on the basis of the parameter and submits the short message to the routing address obtained by the database search.

In the case shown in FIG. 3, the short message given by a subscriber from a mobile station MS arrives at the short message gateway MSC SMS-GMSC1, where the value of the PID parameter is picked from the short message. By using the obtained value as a search index, a database search is performed in the database DB, supplying the routing information to the short message service centre SMSC3. The short message is then submitted to the obtained routing address.

The database DB and the associated functionality according to the invention may also be placed at least in the centre MSC of the same network, as shown in FIG. 3. In this case it is possible for the first centre MSC to pick the PID parameter from the short message and to route the message via a short message gateway MSC to the desired short message service centre. Let us study e.g. a situation where a subscriber wishes to use the services of the short message service centre SMSC4, and the mobile station MS of the subscriber is located within the area related to the mobile switching centre MSC of the same network. The mobile switching centre MSC is provided with database DB, and is arranged to pick the PID parameter from the short message on reception thereof, to perform a database search on the basis of the PID, and to search from the database DB a routing to the short message gateway MSC SMS-GMSC (connection 5) which routs the message to the short message service centre SMSC4 (connection 6).

In some cases, however, the value of the PID parameter is not sufficient as in the above case. The ETSI standard lists a number of telematic devices definable by the PID parameter, but applications exist that are not known to the standard. Alternatively, the subscriber may be using a mobile station that does not comprise a sufficient number of message setting functions to define the desired PID parameters. An advantageous way to specify the identifier is a prefix indicating the transfer format of the short message, the prefix resembling an area code and being supplied by the subscriber in connection with the destination address (TP-DA) of the short message.

The table in FIG. 4 illustrates the use of prefixes in implementing a routing database DB according to the invention. In the example, prefix 991 is reserved for service applications, 992 for e-mail applications, 993 for telefax devices, etc. The chosen prefix is included in the destination address (TP-DA) of the short message, so that the subscriber does not actively have to be aware of all information included in the number, but instead the information is easily transmitted by means of a number series stored in memory. If a subscriber wishes to ask for e.g. weather reports as a short message service, he/she sends a short message from the mobile station to the number "991 1000" and in a while receives a short message comprising the requested information. In this example the service prefix "991" indicates that a service application is involved, and the number series "1000" refers to the weather service of said service application.

In order for the routing to operate with subscribers using several different kind of mobile stations and an increasingly larger number of short message service centres, in the case of the example the database is preferably defined so that correct routing information may be searched for by means of either the PID parameter or the prefix. As regards the invention, it is essential that the identifier chosen is included in the short message to be submitted and that it can be picked as a search index for the routing databases of secondary short message service centres.

When a prefixed short message arrives at the short message gateway MSC SMS-GMSC of the mobile communication system, the centre preferably picks the prefix given by the subscriber and possibly the PID parameter from the message, performs a database search by using either of the parameters or a combination thereof as the search index, and relays the message to the routing address obtained on the basis of the database search.

The placing of a database according to the invention into a mobile communication system is an application-specific choice. FIG. 5 shows a secondary implementation of the invention, where the database DB including routing information is placed in short message service centres SMSC1 to SMSC4. In this case the message is typically submitted to a short message service centre set as a default value in the mobile station, and is routed further to the short message service centre associated with the desired service on the basis of routing information obtained on the basis of the database search in the short message service centre. In this case a database is needed in all the short message service centres with which the network subscribers can communicate.

The block diagram of FIG. 6 illustrates the method of the invention for routing a short message to a desired short message service centre in a system comprising a plurality of short service centres associated with separate services.

At point 10 the subscriber forwards a data message to be submitted as a short message from the mobile station. Having supplied the text, the subscriber supplies the short message destination address (point 20) which possibly even includes a prefix identifying a short message service centre. If a prefix is not used, the subscriber supplies the destination address of the short message in the usual way. If needed, the subscriber may also define message format (points 25, 30). After the specifications, the subscriber issues a short message submit command (point 40). The centre, which can be a visitor centre, a short message gateway MSC, or a short message service centre, picks an identifier from the short message for database search (point 50), and if an identifier is found (point 55), performs a database search using said identifier picked from the short message as the index (point 60). If routing information corresponding to said identifier is found from the database (point 65), the short message is sent to the address of the secondary short message service centre (point 70) searched from the routing database. If no identifier is found, the message is sent to the address of the primary short message service centre included in the short message (point 80).

The drawings and the related description are only intended to illustrate the idea of the invention. To its details, the method and arrangement according to the invention may vary within the scope of the claims. Although the invention has been described above mainly in connection with a short message forwarded the GSM system, the method and arrangement of the invention may also used in other systems providing a corresponding short message service.

What is claimed is:

1. A method for routing a short message to a desired short message service centre in a mobile communication system in which short messages may be sent amid actual signalling and where an address of a short message service centre is included in mobile originated short messages, whereby two or more short message service centres (SMSC1, SMSC2, SMSC3, SMSC4) providing short message services are linked to the mobile communication system, characterized in that the method comprises steps wherein:
a database (DB) for storing identifiers regarding short message services available to subscribers and for each identifier routing information to a related short message service centre is connected to the mobile communication system,
an identifier associated with the desired short message service and supplied by the subscriber is included in a mobile (MS) originated short message,
said identifier is picked from the short message as a response to the received short message,
a database search is performed in said database (DB) connected with the mobile communication system by using at least said identifier picked from the short message as a search index, and
the message is sent to an address of the short message service centre indicated by routing information obtained on the basis of the database search.

2. A method as claimed in claim 1, characterized in that said database (DB) is connected to at least one short message gateway centre (SMS-GMSC1, SMS-GMSC2) of the mobile communication system.

3. A method as claimed in claim 1, characterized in that said database (DB) is connected to at least one short message service centre (SMSC1, SMSC2, SMSC3, SMSC4) linked to the mobile communication system.

4. A method as claimed in claim 2, characterized in that said database (DB) is connected to at least one centre (MSC) of the mobile communication system.

5. A method as claimed in claim 1, characterized in that said identifier comprises at least a prefix associated with the destination address of the short message.

6. A method as claimed in claim 1, characterized in that said identifier comprises at least the value of a PID parameter supplied by the subscriber.

7. A mobile switching centre in a mobile communication system in which short messages may be sent amid actual signalling and where an address of a short message service centre is included in mobile originated short messages, whereby two or more short message service centres (SMSC1, SMSC2, SMSC3, SMSC4) providing short message services are linked to the mobile communication system, characterized in that
the mobile switching centre comprises a database (DB) for storing identifiers regarding short message services available to subscribers and for each identifier routing information to a related short message service centre,
the mobile switching centre is arranged, as a response to the received short message, to pick from the short message an identifier supplied by the subscriber and associated with the desired short message service,
the mobile switching centre is arranged to perform a database search in said database using at least said identifier as a search index,
the mobile switching centre is arranged to send the short message to the address of the short message service centre indicated by the routing information obtained on the basis of the database search.

8. A mobile switching centre as claimed in claim 7, characterized in that said mobile switching centre is a short message gateway centre (SMS-GMSC1, SMS-GMSC2).

9. A mobile switching centre as claimed in claim 7 characterized in that the identifier comprises at least a prefix associated with the destination address of the short message.

10. A mobile switching centre as claimed in claim 7 characterized in that the identifier comprises at least the value of a PID parameter supplied by the subscriber.

11. A short message service centre (SMSC) linked to a mobile communication system, the short message service centre being at least to one subscriber a primary short message service centre whereto the short messages send by said subscriber are routed on the basis of an address of the primary short message included in mobile originated short messages and in which communication system short messages may be sent amid actual signalling, whereby one or more short message service centres (SMSC1, SMSC2, SMSC3, SMSC4) providing short message services and being secondary short message service centres to said at least one subscriber are linked to the mobile communication system, characterized in that the short message service centre comprises a database (DB) for storing identifiers regarding short message services available to subscribers and for each identifier routing information to a related short message service, the short message service centre is arranged, as a response to the received short message, to pick from the short message an identifier supplied by the subscriber and associated with the desired short message service, the short message service centre is arranged to perform a data-base search in said database using at least said identifier as a search index, the short message service centre is arranged to send the short message to the address of the short message service centre indicated by the routing information obtained on the basis of the database search when the address is an address of a secondary short message service centre.

12. A short message service centre as claimed in claim 11, characterized in that said identifier comprises at least a prefix associated with the destination address of the short message.

13. A short message service centre as claimed in claim 11, characterized in that said identifier comprises at least the value of a PID parameter supplied by the subscriber.

14. A mobile communication system in which short messages may be sent amid actual signalling and where an address of a short message service centre is included in mobile originated short messages, whereby two or more short message service centres (SMSC1, SMSC2, SMSC3, SMSC4) providing short message services are linked to the mobile communication system, which comprises a mobile switching centre (SMS-GMSC, MSC), characterized in that mobile switching centre comprises a database (DB) for storing identifiers regarding short message services available to subscribers and for each identifier routing information to a related short message service centre, mobile switching centre is arranged, as a response to the received short message, to pick from the short message an identifier supplied by the subscriber and associated with the desired short message service, mobile switching centre is arranged to perform a database search in said database using at least said identifier as a search index, mobile switching centre is arranged to transmit the short message to the address of the short message centre indicated by the routing information obtained on the basis of the database search.

15. A mobile communication system in which short messages may be sent amid actual signalling and where an address of a short message service centre is included in mobile originated short messages, whereby two or more short message service centres (SMSCI, SMSC2, SMSC3, SMSC4) providing short message services are linked to the mobile communication system, characterized in that at least one short message service centre comprises a database (DB) for storing identifiers regarding short message services available to subscribers and for each identifier routing information to a related short message service centre, said short message service centre comprising said database is arranged, as a response to the received short message, to pick from the short message an identifier supplied by the subscriber and associated with the desired short message service, said short message service centre comprising said database is arranged to perform a database search in said database using at least said identifier as a search index, and said short message service centre comprising said database is arranged to transmit the short message to the address indicated by the routing information obtained on the basis of the database search if the address is not it's own address.

* * * * *